United States Patent
Nose et al.

[11] Patent Number: 5,991,074
[45] Date of Patent: Nov. 23, 1999

[54] STEREOSCOPIC IMAGE DISPLAY APPARATUS

[75] Inventors: Hiroyasu Nose, Tokyo; Hideki Morishima, Kawasaki, both of Japan

[73] Assignee: Canon Kabushiki Kaisha, Tokyo, Japan

[21] Appl. No.: 09/015,345

[22] Filed: Jan. 29, 1998

[30] Foreign Application Priority Data

Jan. 31, 1997 [JP] Japan .................................. 9-032811

[51] Int. Cl.⁶ ........................... G02B 27/26; G02B 27/22
[52] U.S. Cl. ........................... 359/465; 359/464; 348/58; 348/59
[58] Field of Search .................................. 359/465, 464, 359/462, 475, 477; 348/54, 58, 59; 349/15

[56] References Cited

U.S. PATENT DOCUMENTS

| | | | |
|---|---|---|---|
| 5,050,961 | 9/1991 | Venolia | 359/465 |
| 5,083,199 | 1/1992 | Borner | 359/464 |
| 5,264,964 | 11/1993 | Faris | 359/465 |
| 5,327,285 | 7/1994 | Faris | 359/483 |
| 5,465,175 | 11/1995 | Woodgate et al. | 359/464 |
| 5,663,831 | 9/1997 | Mashitani et al. | 359/463 |

FOREIGN PATENT DOCUMENTS

| | | |
|---|---|---|
| 477 882 | 4/1992 | European Pat. Off. . |
| 721 132 | 7/1996 | European Pat. Off. . |
| 63-220226 | 9/1988 | Japan . |

*Primary Examiner*—Jon Henry
*Attorney, Agent, or Firm*—Fitzpatrick, Cella, Harper & Scinto

[57] ABSTRACT

This invention relates to a stereoscopic image display apparatus comprises a display for combining and displaying, in an alternate array in a predetermined direction, plural stripe images divided from each of two parallax image for the left and right eyes; a polarizing member in which stripe-shaped polarizing parts with mutually different polarizing axes are alternately arranged respectively corresponding to the divided stripe images, wherein the divided stripe images are emitted by the polarizing member with different polarization characteristics for the left and right eyes, and the left and right eyes of an observer observing said display unit are respectively given the corresponding parts of the divided plural stripe images by the difference of the polarization characteristics whereby the observer can recognize a stereoscopic image; and an optical member provided with stripe-shaped apertures arranged in a predetermined direction, respectively corresponding to the divided stripe images.

16 Claims, 13 Drawing Sheets

STEREOSCOPIC IMAGE DISPLAY APPARATUS

BACKGROUND OF THE INVENTION

1. Field of the Invention

The present invention relates to a stereoscopic image display apparatus, and more particularly to such apparatus adapted for stereoscopic display of image information by a display device such as a television, a video display, a computer monitor, a game machine or the like and for stereoscopic observation of the image information from a predetermined observation area.

2. Related Background Art

For observing a stereoscopic image, there have been proposed, for example, a method of utilizing polarization spectacles for observing images of a parallax based on mutually different polarized states and a method of utilizing a lenticular lens for guiding images of a predetermined parallax, among the images of plural parallaxes (plural viewing points), to the eyes of the observer.

Among such systems, in the stereoscopic image display apparatus (stereoscopic display) utilizing the polarization spectacles, the polarized state of light is made different from the image for the left eye and that for the right eye and the left and right images are separated by the polarization spectacles. For obtaining different polarized states of light, a liquid crystal shutter is provided on the display to switch the polarizing state in synchronization with the field signal of the displayed image, while the observer utilizes the polarization spectacles whereby the left and right images are separated to the respective eyes on time-shared basis to enable stereoscopic observation.

In this method, the field frequency has to be selected as about 90 to 120 Hz in order to avoid flickering phenomenon. For this reason there is required a display with a high scanning frequency, and the display currently applicable for this purpose is limited to the CRT or the projection display utilizing the CRT.

On the other hand, there is also known a method of placing, on the surface of the display, a polarization control plate in which two polarizing plates with mutually orthogonal polarizing directions are alternately arranged in horizontal stripes and displaying, on the image display area of the display, an image for the left eye and another image for the right eye in alternate horizontal stripes corresponding to the pitch of the horizontally striped polarizing plates, while the observer achieves stereoscopic observation utilizing polarization spectacles with the polarizing plates of mutually orthogonal polarizing direction respectively for the left and right eyes.

In this method, since the left-eye image and the right-eye image are simultaneously displayed in horizontal stripes, the stereoscopic observation without flickering is possible even with a low scanning frequency such as in the liquid crystal display. Such method is disclosed, for example, in the U.S. Pat. Nos. 5,264,964 and 5,327,285.

In the following there will be given a further explanation on the above-explained method of stereoscopic observation, with reference to FIGS. 1 to 4. In FIG. 1, there are shown a notebook-shaped personal computer 101 serving as a stereoscopic image display apparatus, and a stereoscopic display 102 composed of a liquid crystal display provided, on the image display surface thereof, with a polarization control plate 4 in which two polarizing plates 4L, 4R with mutually perpendicular polarizing states are arranged in horizontal stripes.

In observing a two-dimensional image, the polarization spectacles 103 are not used, and each of the left and right eyes of the observer observes all the pixels of the liquid display 102 without recognizing the difference in the polarized state, so that the observer can observe the image as in the ordinary two-dimensional display.

In observing a three-dimensional image, the observer uses the polarization spectacles 103 in which the polarizing directions of the left and right eyes are mutually perpendicular, so that the left and right eyes respectively observe the pixels of different polarizing directions. Thus the stereoscopic observation is made possible by displaying, on the liquid crystal display 102, left and right parallax images corresponding to the polarizing directions of the polarizing plates 4L, 4R in the horizontal stripes of the polarization control plate 4.

In the following there will be explained, with reference to FIGS. 2A, 2B, 3 and 4, the principle of stereoscopic observation in the stereoscopic image display apparatus shown in FIG. 1. FIGS. 2A and 2B are schematic perspective views showing the configuration of a conventional stereoscopic display, wherein a liquid crystal display 1 is composed of glass substrates 2 (2a, 2b) and a pixel display unit 3 provided therebetween and consisting of liquid crystal, electrodes etc. In this drawing there are omitted two polarizing plates having mutually orthogonal polarizing directions and positioned respective in front of the front glass substrate 2a and behind the rear glass substrate 2b, and a rear light source positioned behind the glass substrates.

On the surface of the glass substrate 2a of the observation side, there is provided a polarization control plate 4, in which polarizing plates 4L, 4R, having the polarizing directions indicated by arrows, are arranged in horizontal stripes. Such plate can be fabricated for example by mechanical cutting or by photolithography.

Now, reference is made to FIG. 2B for explaining the relationship of the polarizing directions between the polarizing plates of the liquid crystal display 1 and the polarization control plate 4.

In the ordinary liquid crystal display, the polarizing plates 111, 112 positioned respectively in front of and behind the glass substrates sandwiching the pixel display unit 3 with the liquid crystal, are so provided as to have polarizing directions which are inclined by 45° and are mutually perpendicular, in so-called Cross Nicole state. In the TN normally white mode, white and black are respectively displayed when a voltage is applied and not applied to the liquid crystal.

Since the light transmitted by the liquid crystal display is polarized in a direction of 45° while the polarizing plates constituting the polarization control plate 4 have the horizontal and vertical polarizing directions as shown in FIG. 2B, there are only transmitted polarized components in such directions. If all the pixels of the pixel display unit 3 display white, the amounts of light transmitted by the respective polarizing plates are mutually same and, without the polarizion spectacles, all the pixels can be observed as a two-dimensional image, as in the ordinary liquid crystal display.

The pitch of the horizontal stripes constituted by the polarizing plates 4L, 4R of the polarization control plate 4 is selected equal to or slightly smaller than the width of a pixel row (L, R) corresponding to a scanning line of the pixel display unit 3 of the liquid crystal display 1.

In case of displaying a stereoscopic image, the pixel display unit 3 displays the left-eye image L and the right-eye image R alternately in every scanning line, in such a manner that the left-eye image L corresponds to a stripe of the polarizing plate 4L with the vertical polarizing direction and the right-eye image R corresponds to a stripe of the polarizing plate 4R with the horizontal polarizing direction.

The observer uses the polarization spectacles in which the left eye has a polarizing plate 4L with the vertical polarizing direction and the right eye has a polarizing plate 4R with the horizontal polarizing direction. Since each polarizing plate intercepts the polarized light of the perpendicular polarized direction, the left-eye image L and the right-eye image R are separated and observed respectively by the left and right eyes.

FIG. 3 is a lateral cross-sectional view of the stereoscopic display shown in FIGS. 2A and 2B. The pixel display unit 3 of the liquid crystal display 1 is composed of a black matrix 10, separating the pixels in the vertical direction, and pixel apertures 11, which are so provided that the polarizing plates 4L, 4R in the horizontal stripes of the polarization control plate 4 are positioned on the line between the eye 12 of the observer wearing the polarization spectacles 13 and each pixel aperture 11.

If the polarization control plate 4 can be positioned directly on the pixel display unit 3 of the liquid crystal display 1, there will not occur mutual aberration between the displayed pixels and the polarizing plates 4L, 4R regardless of the position of the observer. In practice, however, the glass substrate of the liquid crystal display has a certain thickness and the polarization control plate 4 cannot be positioned closer thereto. For this reason, depending on the height of the eyes 12 of the observer, the pixel display unit 3 becomes displaced with respect to the polarizing plates 4L, 4R so that the left and right images L, R cannot be satisfactorily separated and the stereoscopic observation cannot be obtained at a certain height of the eyes 12 of the observer.

More specifically, when the eyes 12 of the observer are at a position a1 in the vertical direction V, the polarizing plates 4L, 4R appear completely superposed with the pixel apertures 11, so that the left-eye image L and the right-eye image R are completely separated and a normal stereoscopic image can be observed.

However, if the eyes 12 of the observer move in the vertical direction to a position a4, the line connecting the pixel aperture 11 and the eyes 12 rides on the vertically adjacent polarizing plates of horizontal stripe shape on the polarization control plate 4, so that the light emerging from a same pixel aperture 11 contains mutually perpendicular polarized components.

Also when the eyes of the observer further move to a position a2, the light emerging from the same pixel aperture 11 completely passes through the adjacent polarized plate and horizontal stripe shape of the perpendicular polarizing direction, whereby the left eye only receives the right-eye image R while the right eye only receives the left-eye image L to realize a state of inverse stereoscopic observation.

A graph at the left-hand side of FIG. 3 indicates the change in the amount of polarized component, wherein the abscissa indicates the proportion of the polarized light component entering either eye, or the amount of crosstalk. When the eyes of the observer are at the position a1 where the left and right images are completely separated without crosstalk, there is only received the normal polarized component and the proportion of the polarized component is defined as 1. On the other hand, when there is only received the polarized component which is perpendicular to the normal component, there is reached a state of inverse stereoscopic observation and the proportion of the polarized component is defined as zero.

When the polarized components are mixed half and half, the proportion is defined as 0.5 or a state of half crosstalk. With the movement of the eye position from a1, the proportion of the polarized component gradually decreases with the corresponding increase of crosstalk, and reaches 0 at the position a2 or a3 where the state of completely inverse stereoscopic observation is reached.

FIG. 4 shows the stereoscopic observation areas at the optimum observation distance for the stereoscopic display 201 of the above-explained configuration, wherein 202 indicates areas (represented by solid lines) allowing normal stereoscopic observation while 203 indicates areas (represented by broken lines) providing inverse stereoscopic observation, and these areas appear periodically in the vertical direction V. As will be apparent from this drawing, the eye height allowing stereoscopic observation without crosstalk is limited to the line a1, and the stereoscopic observation area is practically limited in the vertical direction because of the generation of the crosstalk.

In case of three-dimensional display in the conventional stereoscopic display utilizing the polarization control plate as shown in FIGS. 1 to 4, there is generated an optimum observation height, allowing stereoscopic observation, in the vertical direction of the displayed image. Observation from a higher or lower position involves a gradually increasing amount of crosstalk, eventually reaching a state of inverse stereoscopic image, whereby the stereoscopic display performance is significantly deteriorated. Also for obtaining the stereoscopic image, the observer is required to maintain the eyes at the optimum observation height, whereby the observer is constantly subjected to a burden, leading to fatigue.

Also the limitation in the observation height limits the viewing position, thereby rendering the observation with plural persons quite difficult.

SUMMARY OF THE INVENTION

A first object of the present invention is to provide a stereoscopic image display apparatus which displays the three-dimensional image utilizing a polarization control plate and is capable of expanding the stereoscopic observation area with limited crosstalk in the vertical direction by means of a barrier having an aperture elongated in a suitable predetermined direction or a lenticular lens, thereby reducing the fatigue of the observer and facilitating the stereoscopic observation by plural observers.

Other objects of the present invention, and the features thereof, will become fully apparent from the following description of the embodiments.

DESCRIPTION OF THE PREFERRED EMBODIMENTS

Figure 1:
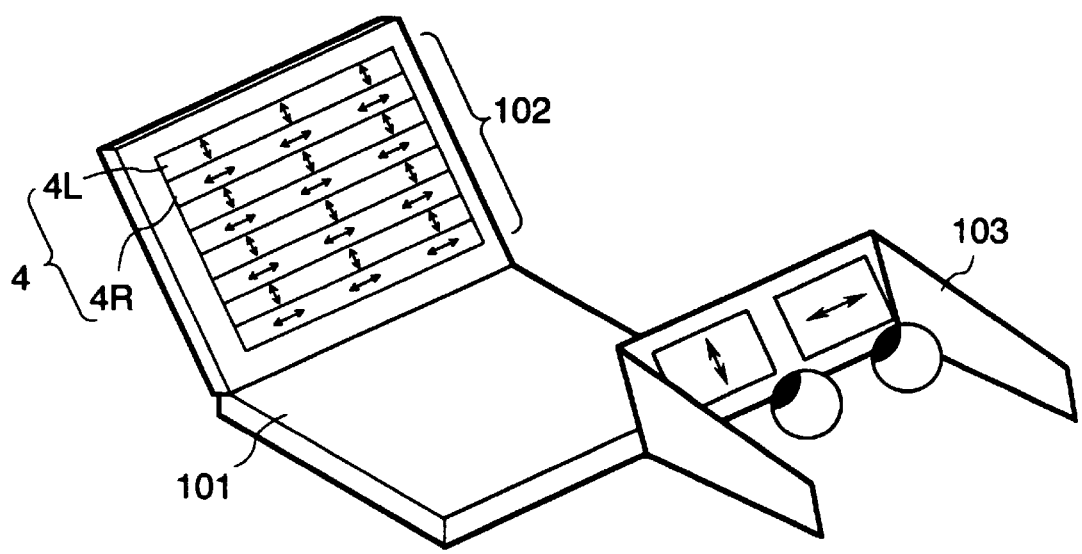
FIG. 1 is a schematic perspective view of a conventional stereoscopic viewing system.
Figure 2A:
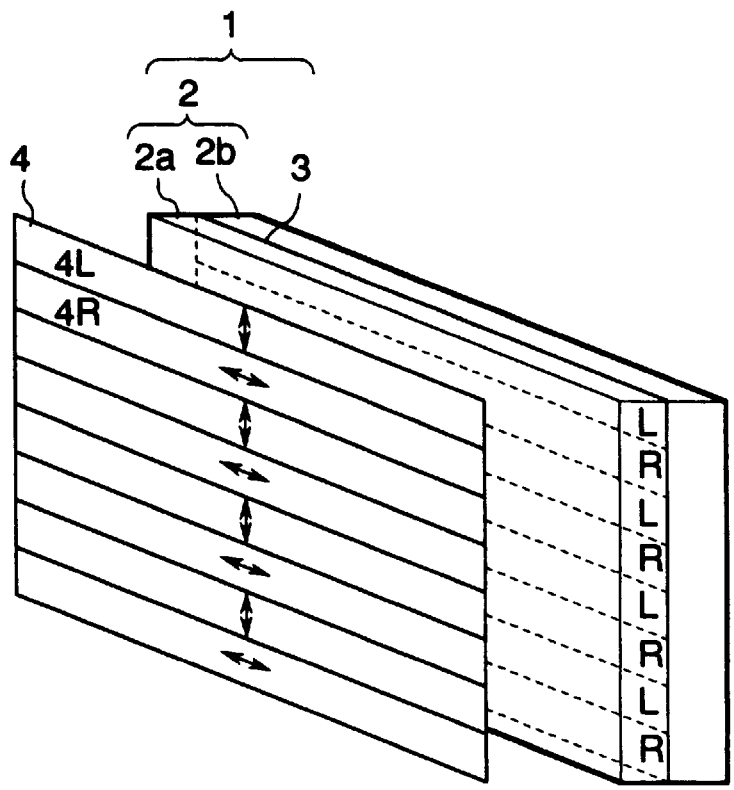
FIGS. 2A and 2B are respectively a schematic perspective view of a conventional configuration and a schematic view showing the polarizing directions of the polarizing plates.
Figure 2B:
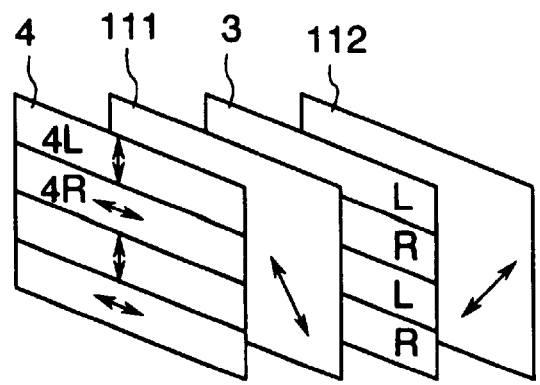
Figure 3:
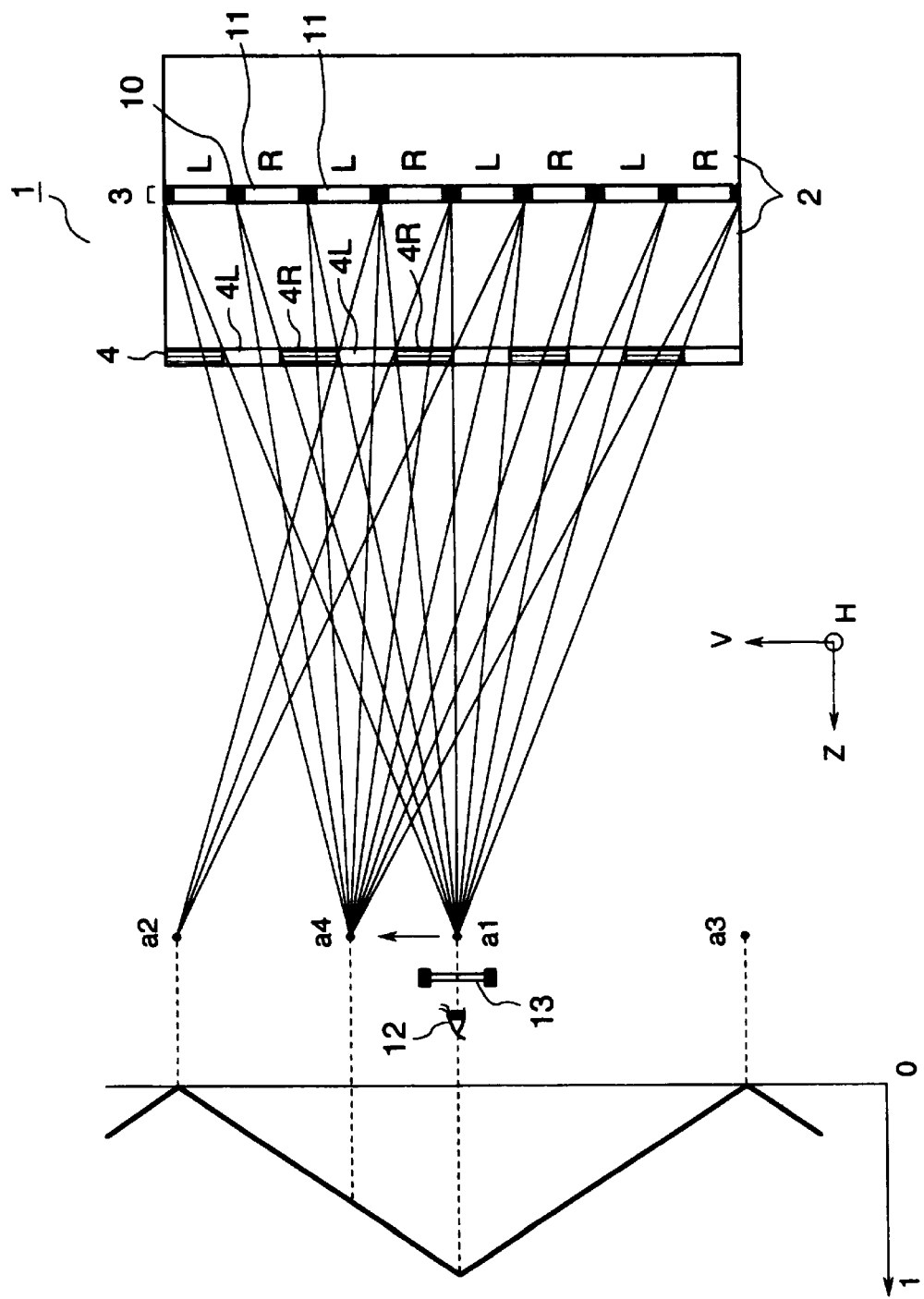
FIG. 3 is a lateral cross-sectional view of the system shown in FIG. 1.
Figure 4:
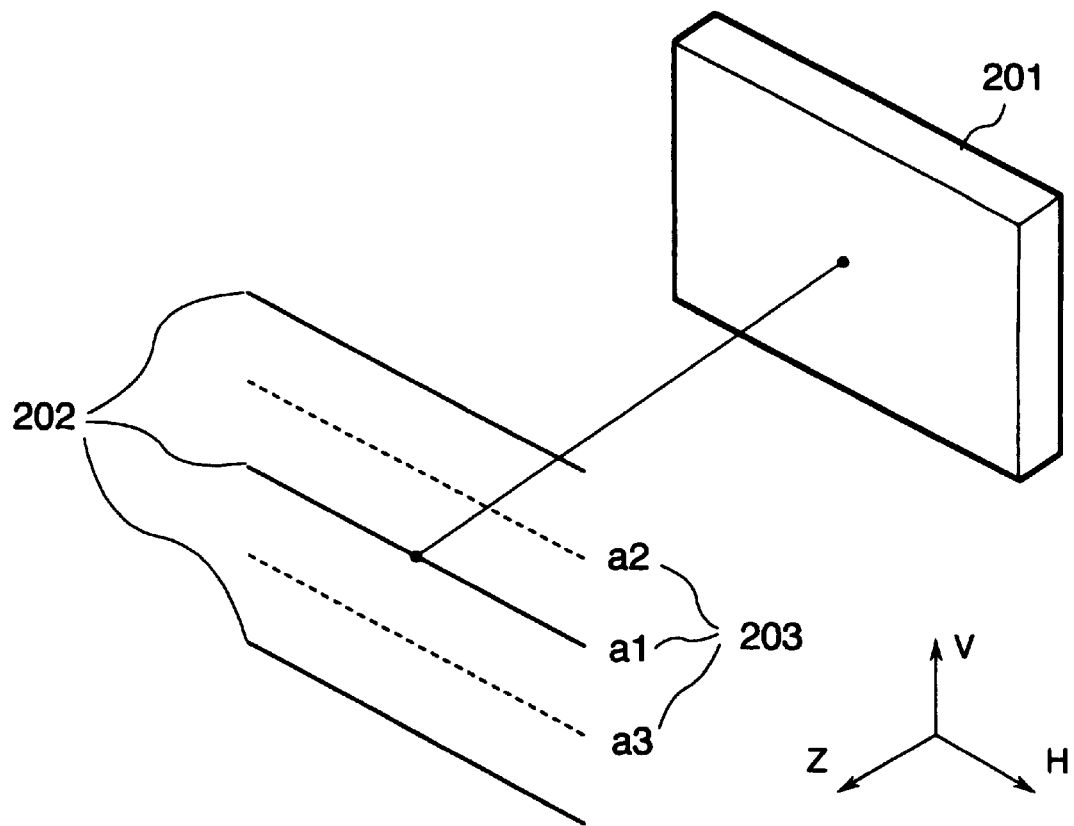
FIG. 4 is a view showing the stereoscopic viewing areas in the system shown in FIG. 1.
Figure 5:
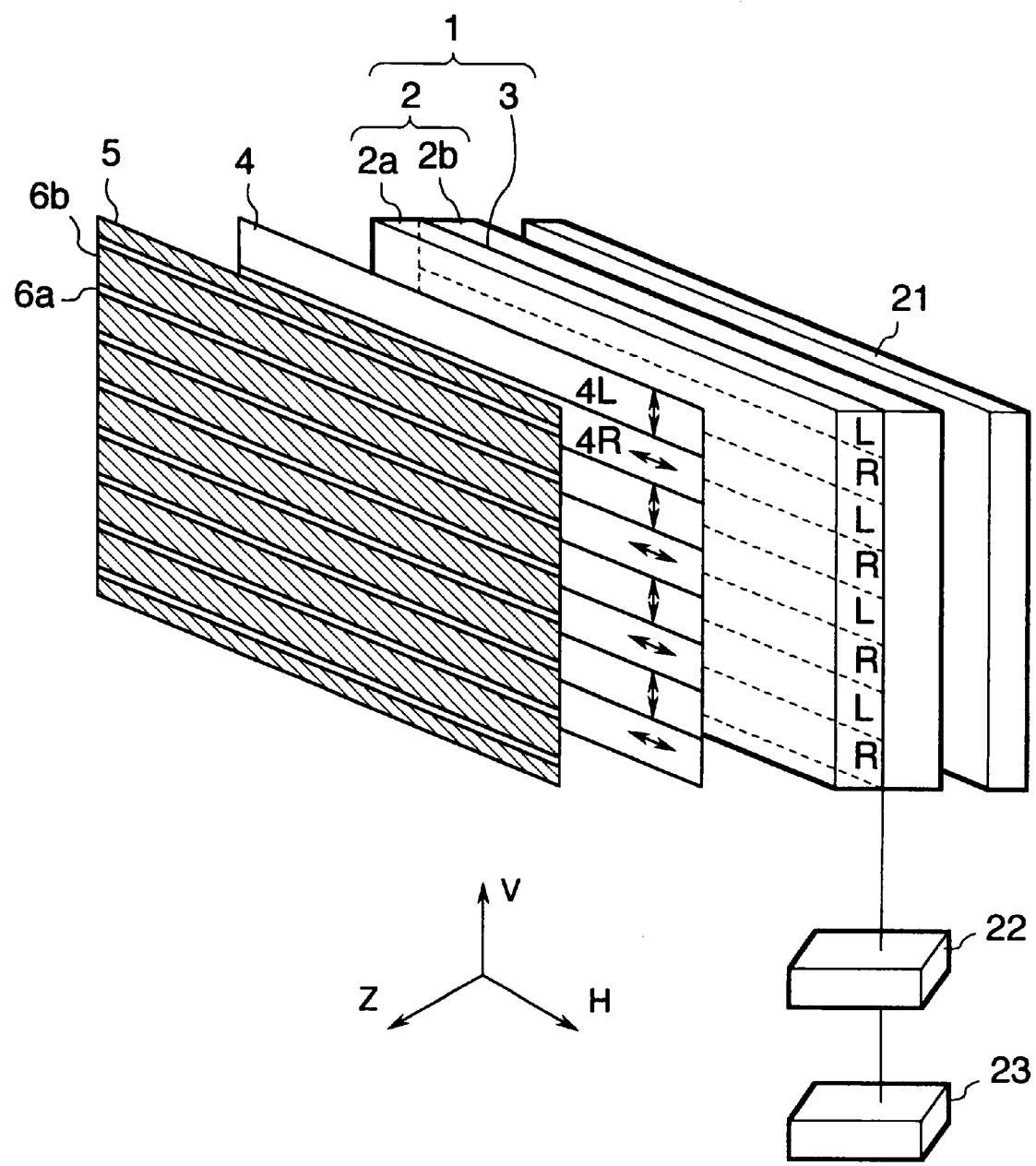
FIG. 5 is a schematic perspective view showing the configuration of an embodiment 1 of the present invention.
Figure 6:
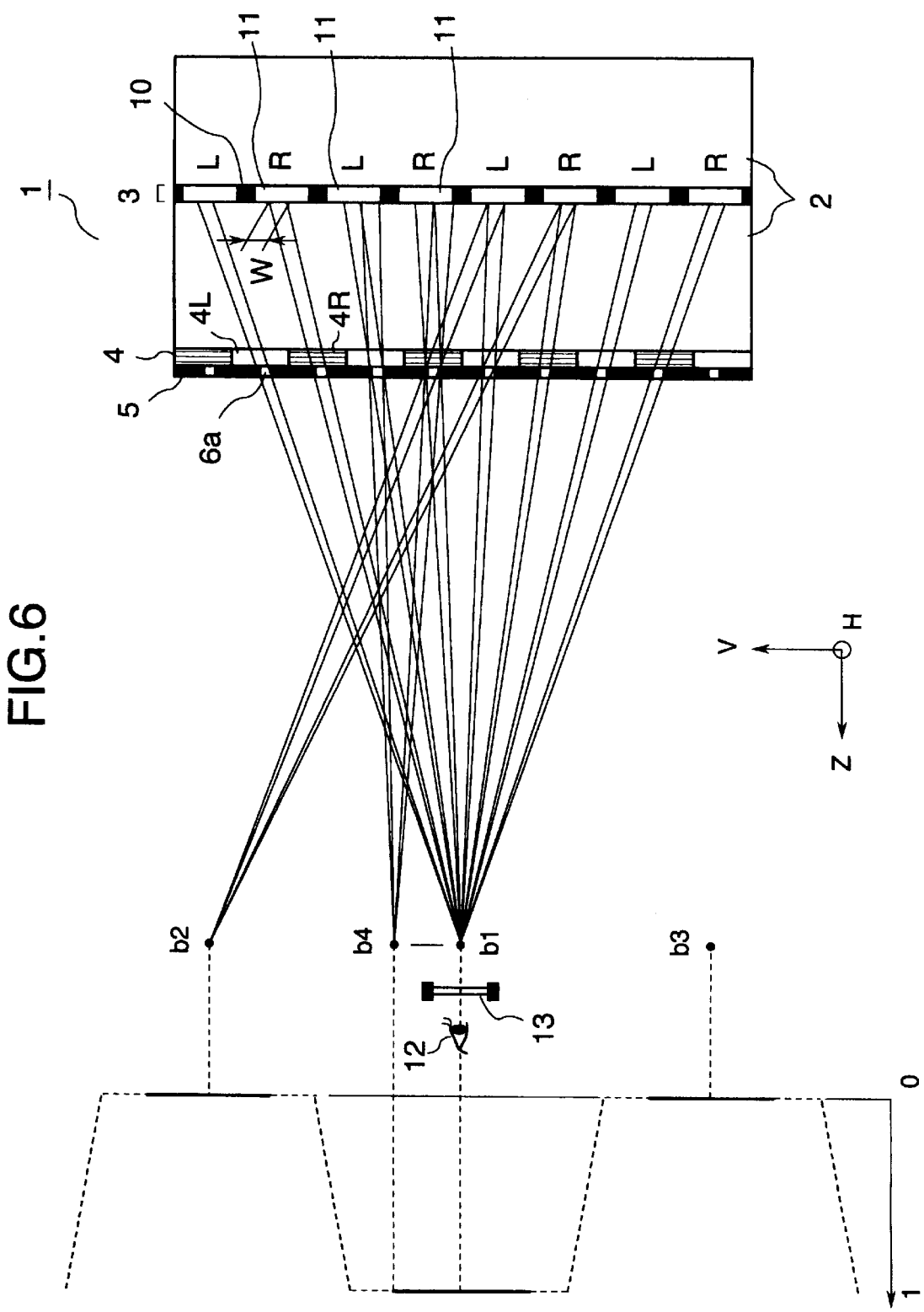
FIG. 6 is a lateral cross-sectional of the embodiment 1 of the present invention.
Figure 7:
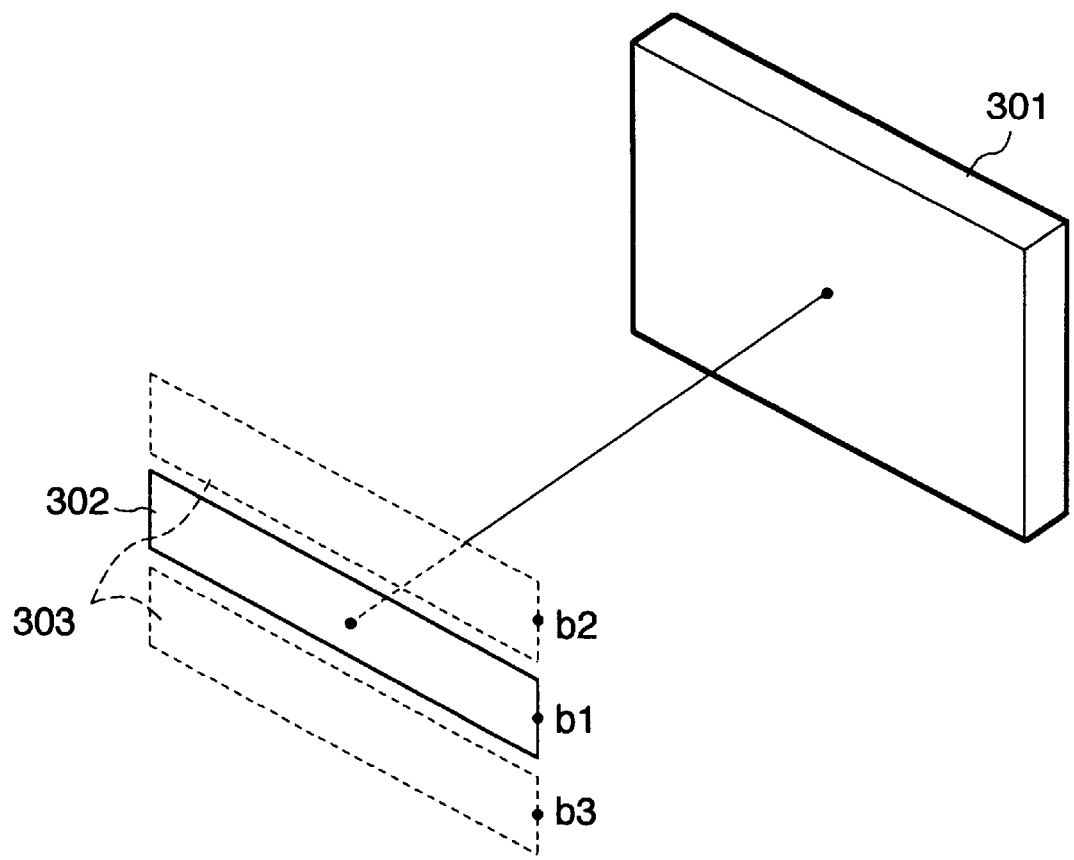
FIG. 7 is a view showing the stereoscopic viewing area of the embodiment 1 of the present invention.

FIG. 5 is a schematic perspective view of an embodiment 1 of the present invention. FIG. 6 is a view showing the principle of stereoscopic observation of the embodiment shown in FIG. 5. FIG. 7 is a view showing an area allowing stereoscopic observation in the embodiment shown in FIG. 5.

In FIG. 5, there is shown a liquid crystal display (LCD) 1 for image display, provided therein with a pixel display unit 3, glass substrates 2a, 2b respectively provided in front of and behind the pixel display unit 3, polarizing plates (not shown) having mutually orthogonal polarizing directions and provided respective in front of the glass substrate 2a and behind the glass substrate 2b, electrodes (not shown), a rear light source (light source means) 21 etc.

On the pixel display unit 3 for image display, there are displayed two parallax images (R, L) corresponding to two viewing points respectively for the right and left eyes, alternately in horizontal stripes extended in the H direction. A display drive circuit 22 displays the images synthesized in horizontal stripes, on the display 1. An image processing circuit 23 extracts a plurality of parallax images L, R in horizontal stripes from a set of parallax images obtained by observing a three-dimensional object from two viewing points, and combines thus extracted images by arranging these images with a predetermined order and a predetermined pitch in the vertical direction V thereby obtaining a combined horizontal stripe image for supply to the display drive circuit 22.

A polarization control plate 4 is composed of a repeated array, with a predetermined pitch in the vertical direction, of two polarizing plates 4L, 4R of a horizontal stripe shape, respectively transmitting polarized lights of mutually orthogonal directions. Such polarizing plates 4L, 4R of horizontal stripe shape respectively correspond to the horizontal striped parallax images L, R on the pixel display unit 3. A barrier 5 is provided with apertures 6a of a horizontal stripe shape, with a width narrower than the pitch of the polarizing plate of the polarization control plate 4, and with light shielding portions 6b.

The barrier 5 is formed by forming a film of chromium or chromium oxide on a glass substrate and patterning such film, or by coating the glass substrate wit black resin and patterning such black resin layer.

Now, reference is made to FIG. 6 for explaining the state of stereoscopic observation of the parallax images displayed on the pixel display unit 3 of the present embodiment. As shown in FIG. 6, the polarizing plates 4L, 4R in horizontal stripes of the polarization control plate 4 are positioned on the line between the eyes 12 of the observer wearing the polarization spectacles 13 and the pixel apertures 11 where the parallax images L, R are displayed on the pixel display unit 3 of the liquid crystal display 1. The barrier 6 is provided in front of the polarization control plate 4, in such a manner that the apertures 6a of the barrier 5 respectively correspond to the polarizing plates 4L, 4R of the polarization control plate 4 and are on the lines between the eyes 12 of the observer and the centers of the pixel apertures 11 displaying the parallax images.

When the eyes 12 of the observer lie in a vertical position b1, the observer observes a part (width w) of the pixel apertures 11 of the pixel display unit 3, through the apertures 6a of the barrier 5 and the corresponding polarizing plates 4L, 4R. The left-eye image L and the right-eye image R are completely separated by the polarization spectacles 13 whereby the normal stereoscopic observation can be attained.

When the observer moves to a vertical position b4, the line between the aperture 6a of the barrier 5 and the eyes of the observer is shifted from the center of the pixel aperture, but the observed width w does not still reach the black matrix 10 of the pixel display unit 3 but remains in a part of the same pixel aperture 11, whereby the left-eye image L and the right-eye image R can be completely separated to enable normal stereoscopic observation as in the eye position b1.

As the observer moves further upwards in the vertical direction V, the observed width w of the pixel display unit 3 rides on the black matrix 10 whereby the amount of light gradually decreases, and the observed width moves to the adjacent pixel aperture 11. The adjacent pixel aperture 11 displays the parallax image for the other eye, which is also observed through the same polarizing plate, whereby the crosstalk gradually increases.

When the eyes of the observer moves to a position b2, the parallax image for the other eye alone is observed through the same aperture 6a of the barrier 6, whereby the left eye only receives the image for the right eye while the right eye only receives the image for the left eye. Thus there is reached a state of inverse stereoscopic observation.

A graph at the left-hand side of FIG. 6 shows the change in the polarized component, wherein abscissa indicates the proportion of the polarized component of light entering either eye or the amount of crosstalk. When the eyes 12 of the observer is in a solid-lined range including the position b1, the left and right images are completely separated and the normal polarized component alone is received without crosstalk, so that the above-mentioned proportion becomes 1. In a broken-lined range, the light amount decreases while the crosstalk increases whereby the stereoscopic observation is significantly deteriorated. In the position b2 or b3, the proportion of the polarized component becomes 0, thereby providing a state of completely inverse stereoscopic observation.

FIG. 7 shows the actual stereoscopic observation areas of the present embodiment, indicating the stereoscopic observation area in the stereoscopic display 301 of the present embodiment, at the optimum observation distance. 302 indicates a normal stereoscopic observation area where proper stereoscopic image can be observed. 303 indicates inverse stereoscopic observation areas which appear periodically in the vertical direction.

The stereoscopic observation area enabling stereoscopic observation without crosstalk in the vertical direction is expanded, from a mere linear area in the conventional stereoscopic display, to a certain width in the present embodiment, whereby the observer is assured of satisfactory stereoscopic observation without paying too much attention to the vertical position and is therefore relieved from fatigue.

In the present embodiment, the barrier 5 is positioned in front of the polarization control plate 4, but it may also be positioned behind the polarization control plate 4, namely at the side of the display 1 thereof. Also barrier portions may be provided between the polarizing plates constituting the polarization control plate 4.

It is also possible to obtain a stereoscopic observation area having a width in the horizontal direction, by displaying, on the pixel display unit 3, two parallax images in vertical stripes of a predetermined pitch instead of the parallax images of horizontal stripes and arranging the polarizing plates of the polarization control plate 4 and the apertures of the barrier 5 in corresponding vertical stripe shapes.

In the present embodiment, as explained in the foregoing, a polarization control plate composed of an array of polarizing plates of different polarizing states is provided in front of the display, and, for the observation with the polarization spectacles, there is employed a barrier with plural apertures is combined with the polarization control plate.

This configuration is further featured by facts that the polarization control plate is composed of an alternate array of the polarizing plates of mutually orthogonal polarizing directions in horizontal stripes, and that the barrier is provided with apertures in horizontal stripe shapes corresponding to the pitch of the horizontal stripes of the polarization control plate, the width of such apertures being smaller than the pitch of the horizontal stripes of the polarization control plate.

Figure 8:
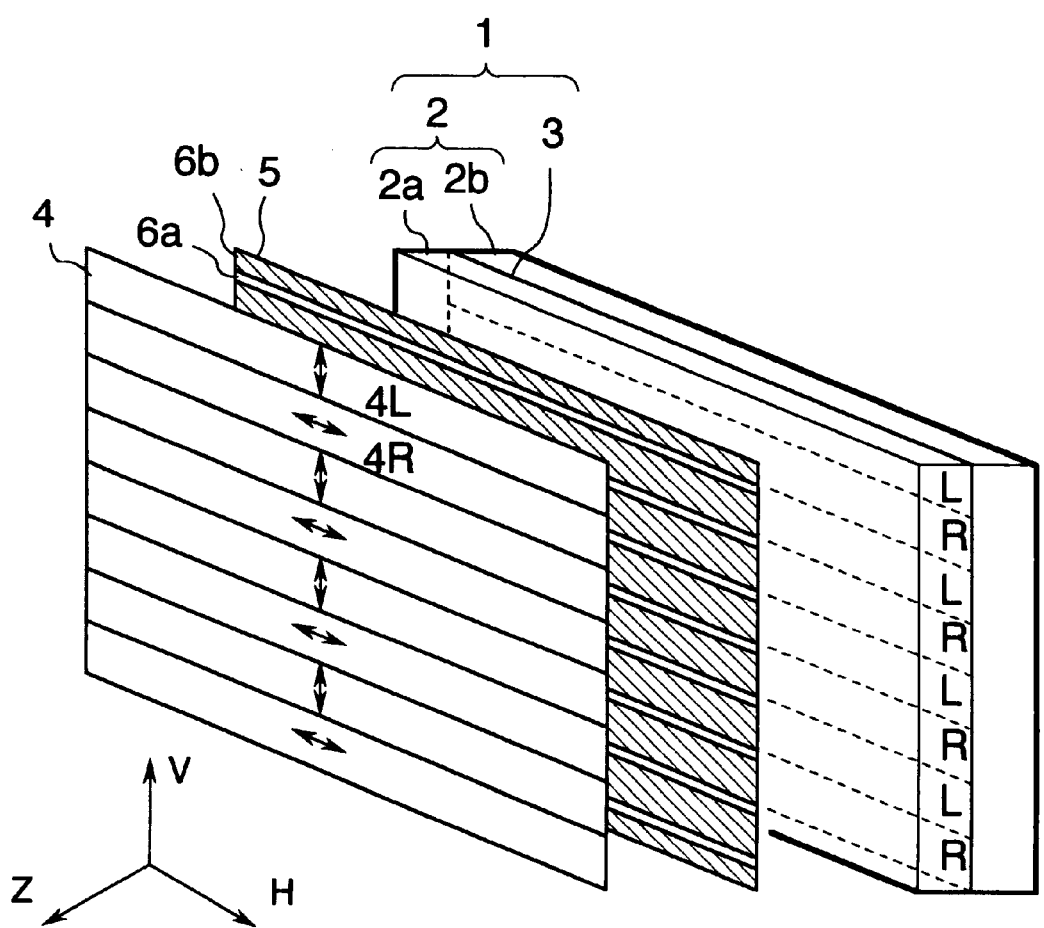
FIG. 8 is a schematic perspective view showing the configuration of an embodiment 2 of the present invention.
Figure 9:
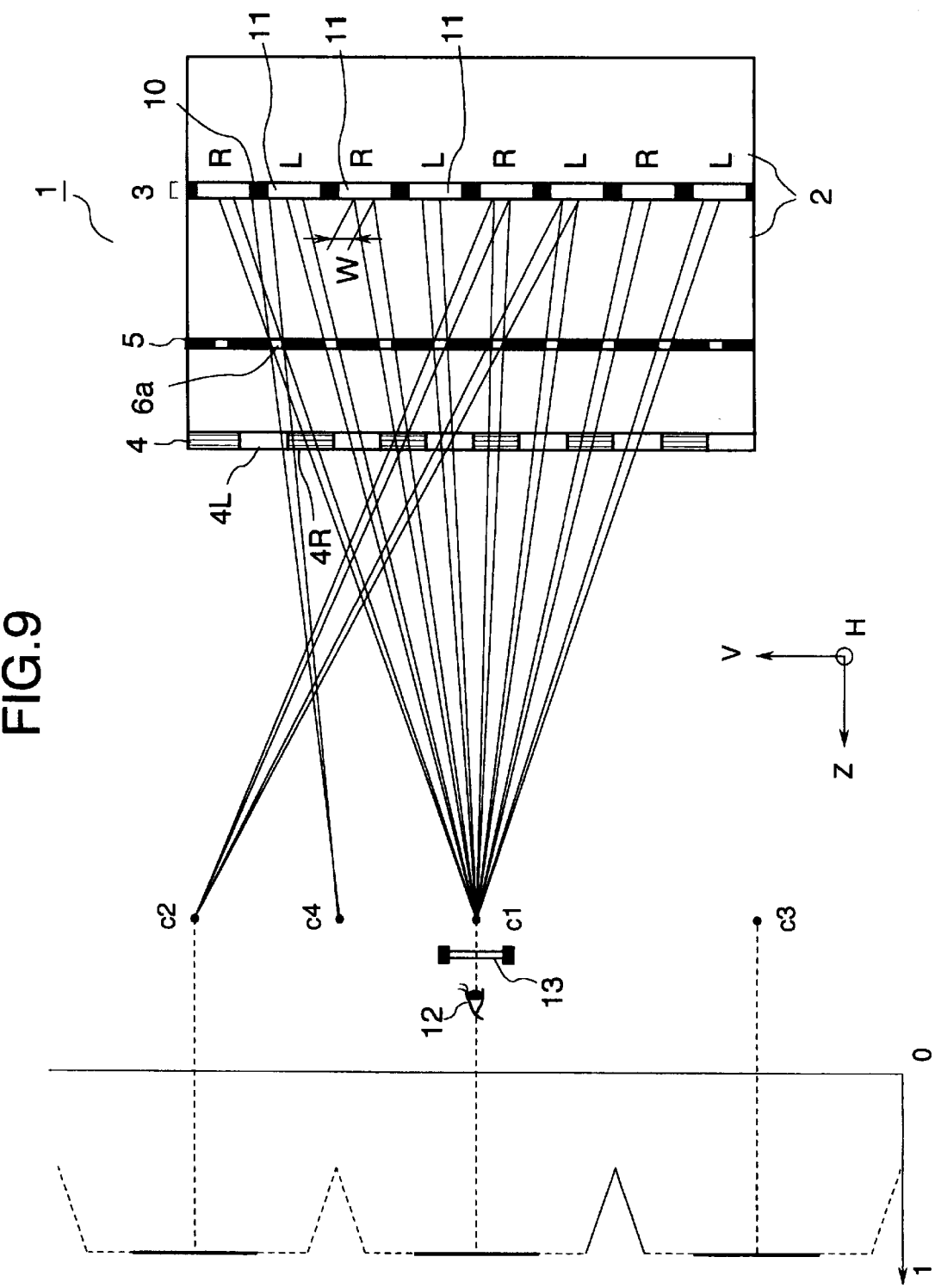
FIG. 9 is a lateral cross-sectional of the embodiment 2 of the present invention.
Figure 10:
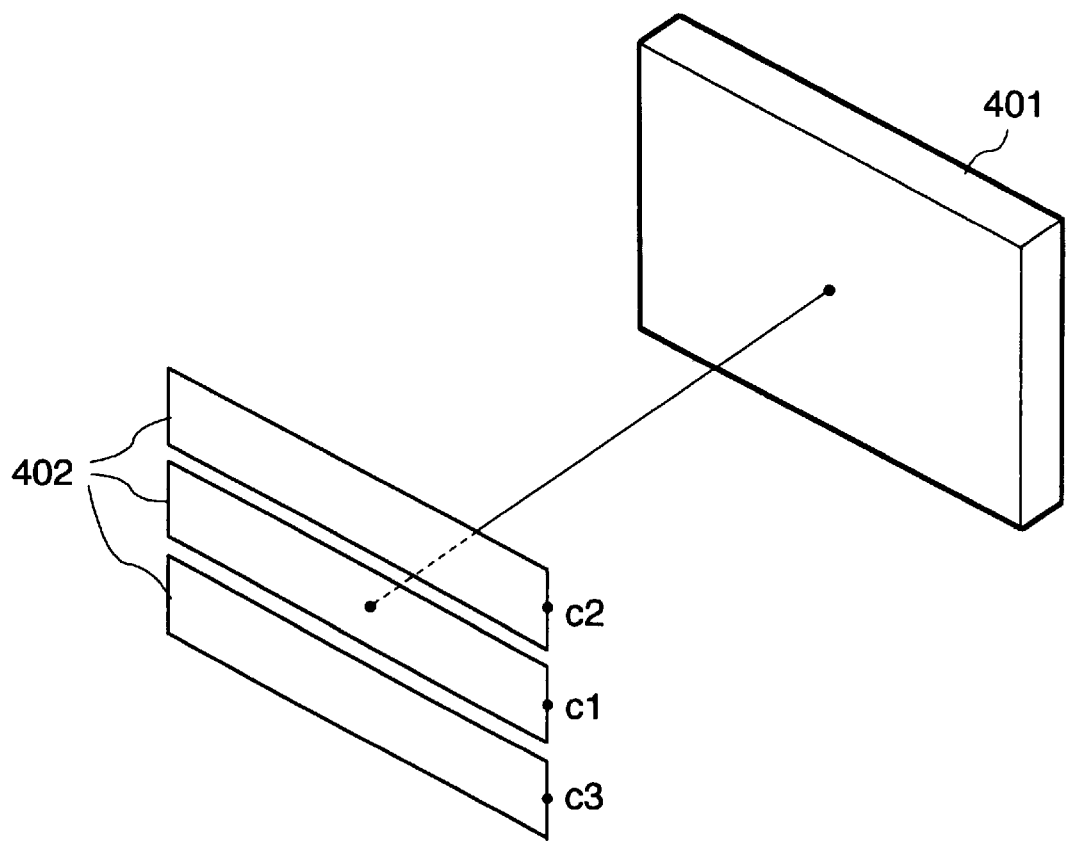
FIG. 10 is a view showing the stereoscopic viewing area of the embodiment 2 of the present invention.

FIG. 8 is a schematic perspective view of an embodiment 2 of the present invention, while FIG. 9 is a view showing the principle of stereoscopic observation of the embodiment shown in FIG. 8, and FIG. 10 is a view showing an area allowing stereoscopic observation in the embodiment shown in FIG. 8.

This embodiment is only different from the embodiment 1 in that the barrier 5 is positioned between the polarization control plate 4 and the liquid crystal display 1 but is same in all other aspects.

Now, reference is made to FIG. 9 for explaining the state of stereoscopic observation of the parallax images displayed on the pixel display unit 3 of the present embodiment.

The polarizing plates 4L, 4R in horizontal stripes of the polarization control plate 4 are positioned on the line between the eyes 12 of the observer wearing the polarization spectacles 13 and the pixel apertures 11 where the parallax images L, R are displayed on the pixel display unit 3 of the liquid crystal display 1. Also the apertures 6a of the barrier 5 are positioned on the lines between the eyes 12 of the observer and the centers of the pixel apertures 11 displaying the parallax images, whereby the observer observes the corresponding pixel apertures 11 through the polarizing plates and the apertures 6a of the barrier 5.

When the eyes 12 of the observer lie in a vertical position c1, the observer observes, in superposed manner, the polarizing plates and a part (width W) of the pixel apertures 11 of the pixel display unit 3, through the apertures 6a of the barrier 5. The left-eye image L and the right-eye image R are completely separated by the polarization spectacles 13 whereby the normal stereoscopic observation can be attained.

When the observer moves in the vertical direction V, the line between the aperture 6a of the barrier 5 and the eyes of the observer is shifted from the center of the pixel aperture, but, as long as the observed width W does not still reach the black matrix 10, a part of the same pixel aperture 11 is still observed. If the position of the barrier 5 is so selected that the line between the aperture 6a of the barrier 5 and the eyes of the observer moves within the same corresponding polarizing plate 4, the left-eye image L and the right-eye image R can be completely separated to enable normal stereoscopic observation as in the eye position c1.

As the observer moves further upwards in the vertical direction V to a position c4, the observed width W of the pixel display unit 3 rides on the black matrix 10 whereby the amount of light gradually decreases and the crosstalk is generated. With further movement, the observed width moves to the adjacent pixel aperture 11 and the corresponding polarizing plate is switched to the adjacent one, but, at a position c2, the normal stereoscopic observation is made possible as the combination between the left and right images L, R and the polarizing directions of the polarizing plates remains same.

A graph at the left-hand side of FIG. 9 shows the change in the polarized component, wherein abscissa indicates the proportion of the polarized component of light entering either eye or the amount of crosstalk. When the eyes 12 of the observer is in a solid-lined range including the position c1, the left and right images are completely separated and the normal polarized component alone is received without crosstalk, so that the above-mentioned proportion becomes 1. In a broken-lined range, the light amount decreases while the crosstalk increases whereby the stereoscopic observation is significantly deteriorated. In the position c2 or c3, the combination of the left and right images and the polarizing directions of the polarizing plates remains same, whereby normal stereoscopic observation can be obtained.

FIG. 10 shows the actual stereoscopic observation areas of the present embodiment, indicating the stereoscopic observation area in the stereoscopic display 401 of the present embodiment, at the optimum observation distance. 402 indicates normal stereoscopic observation areas which appear periodically in the vertical direction, and there is no inverse stereoscopic observation area. The stereoscopic observation area enabling stereoscopic observation without crosstalk in the vertical direction is further expanded, whereby the observer is assured of satisfactory stereoscopic observation without paying too much attention to the vertical position and is therefore relieved from fatigue.

Figure 11:
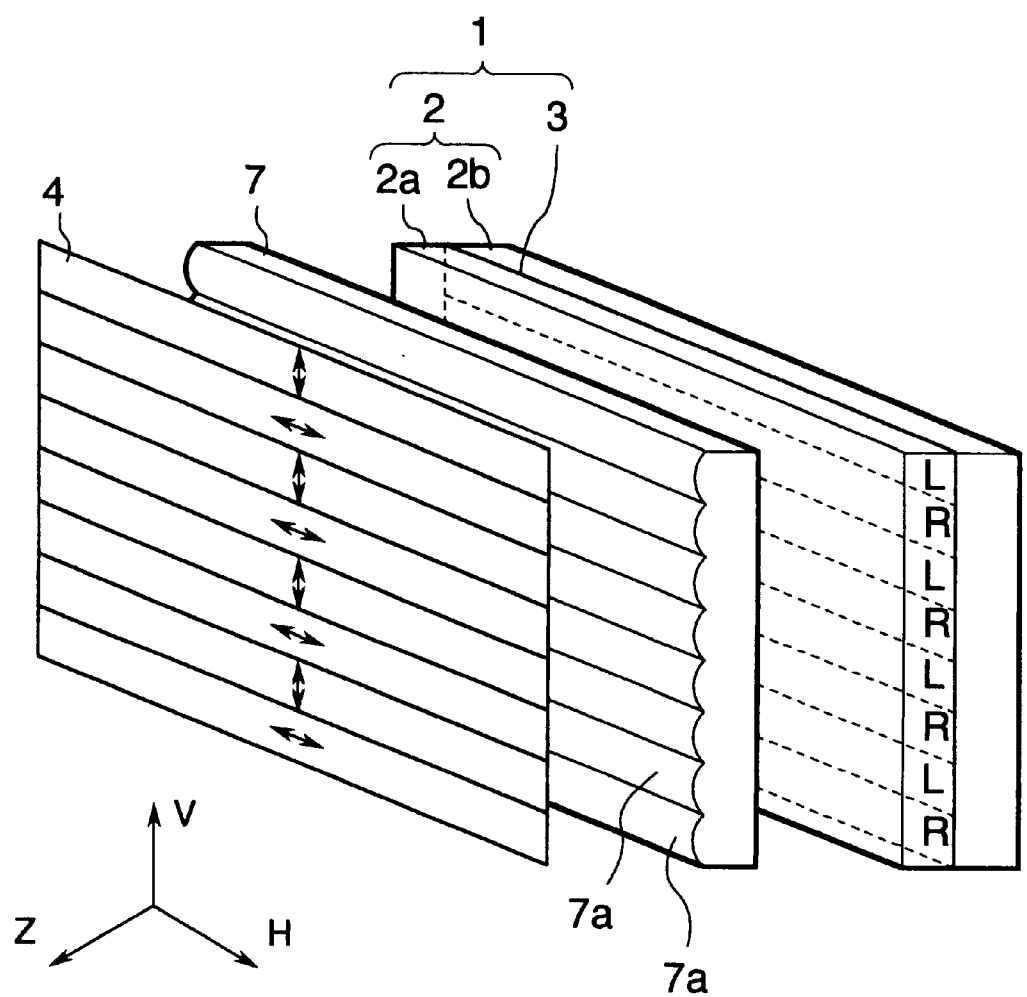
FIG. 11 is a schematic perspective view showing the configuration of an embodiment 3 of the present invention.
Figure 12:
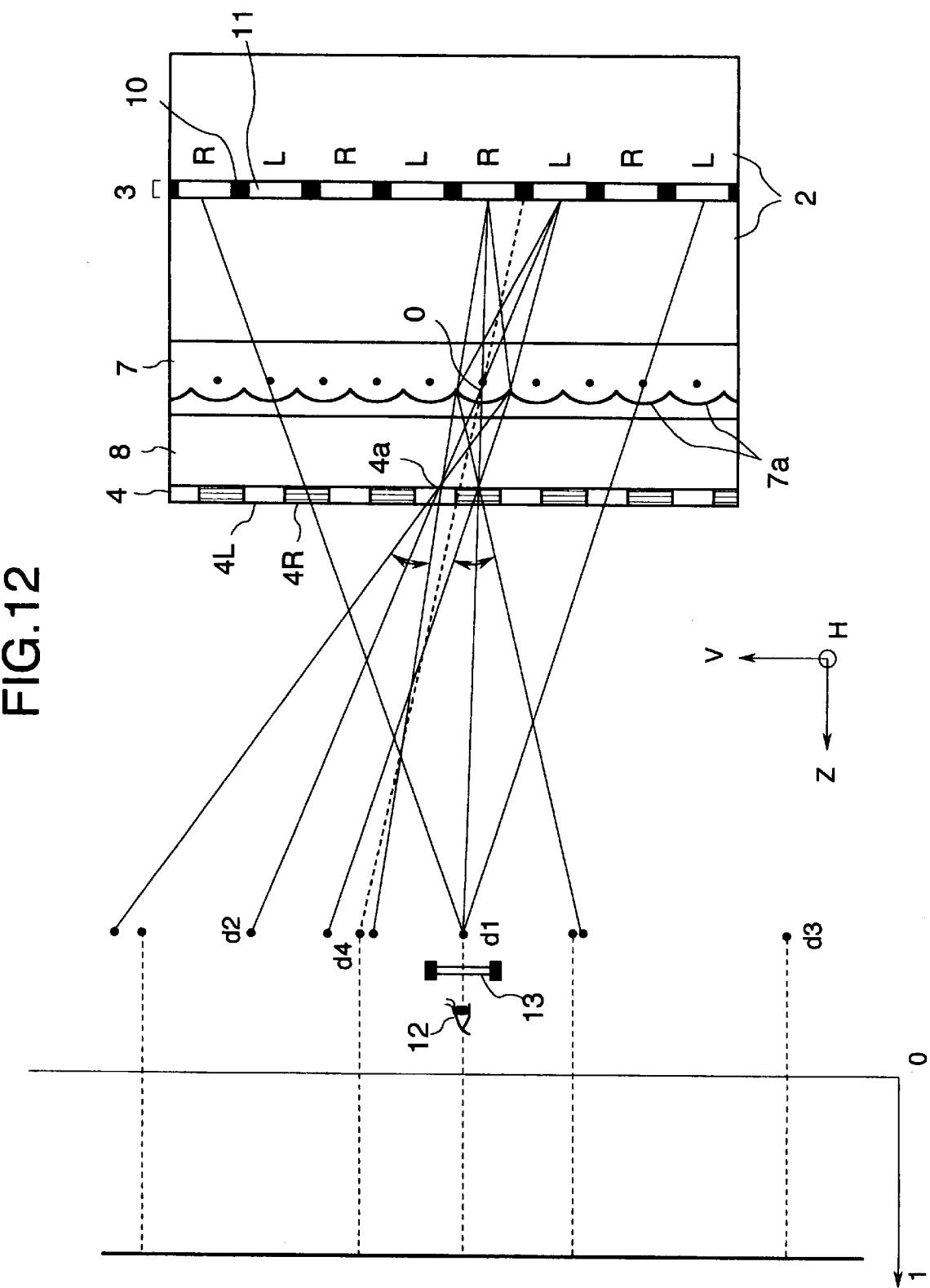
FIG. 12 is a lateral cross-sectional of the embodiment 3 of the present invention.
Figure 13:
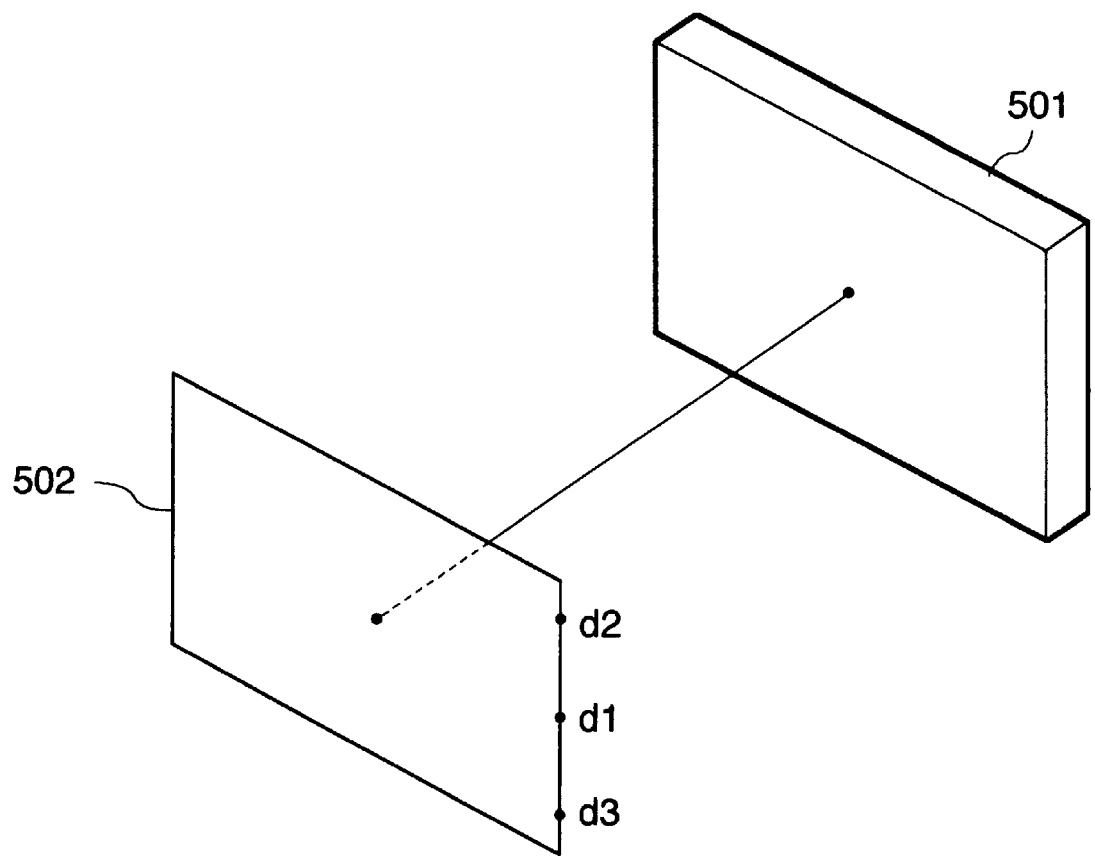
FIG. 13 is a view showing the stereoscopic viewing area of the embodiment 3 of the present invention.

FIG. 11 is a schematic perspective view of an embodiment 3 of the present invention, while FIG. 12 is a view showing the principle of stereoscopic observation of the embodiment shown in FIG. 11, and FIG. 13 is a view showing an area allowing stereoscopic observation in the embodiment shown in FIG. 11.

This embodiment is only different from the embodiment 2 shown in FIG. 8 in that the barrier 5 is replaced by a lenticular lens 7 which is composed of an array, with a predetermined pitch in the vertical direction V, of cylindrical lenses 7a of a horizontal stripe shape having a refractive power in the vertical direction V, but is same in all other aspects.

In the present embodiment, the lenticular lens 7 is positioned between the polarization control plate 4 and the liquid crystal display 1. The cylindrical lenses 7a constituting the lenticular lens 7 are arrayed horizontally, with a pitch corresponding to that of the polarizing plates 4L, 4R in horizontal stripes of the polarization control plate 4. The lenticular lens 7 is prepared by molding a resinous material such as acrylic resin or polycarbonate, or by replica formation with photosensitive resin on a glass substrate.

Now, reference is made to FIG. 12 for explaining the state of stereoscopic observation of the parallax images displayed on the pixel display unit 3 of the present embodiment.

The polarizing plates 4L, 4R in horizontal stripes of the polarization control plate 4 are positioned on the line between the eyes 12 of the observer wearing the polarization spectacles 13 and the pixel apertures 11 where the parallax images L, R are displayed on the pixel display unit 3 of the liquid crystal display 1. Also the cylindrical lenses 7a of the lenticular lens 7 are positioned on the lines between the eyes 12 of the observer and the centers of the pixel apertures 11, whereby the observer observes the corresponding pixel apertures 11 through the polarizing plates 4L, 4R and the cylindrical lenses 7a.

The position of the lenticular lens 7 and the curvature of the cylindrical lenses 7a thereof are so designed as to focus the image of the pixel display unit 3 on the polarizing plates 4 with such a magnification that the pitch of the pixel display unit 3 coincides with that of the polarizing plates 4L, 4R.

When the eyes 12 of the observer are in a vertical position d1, the lights coming from the pixel apertures 11 of the pixel display unit 3 on the lines passing through the eyes 12 of the observer and the principal points 0 of the cylindrical lenses 7a of the lenticular lens 7 are focused on the polarizing plates 4L, 4R and the observer observes a part of the lights spreading therefrom. Since, in this state, the images of the pixel apertures 11 are formed in complete one-to-one correspondence on the polarizing plates 4L, 4R, the left-eye image L and the right-eye image R are completely separated by the polarization spectacles 13 whereby the normal stereoscopic observation can be attained.

When the eyes of the observer lies in a position d2, the correspondence between the pixel apertures 11 and the polarizing plates 4L, 4R are simultaneously switched on the lines between the eyes 12 and the principal points of the cylindrical lenses of the lenticular lens 7 in comparison with the situation at the point d1, so that the polarized states of the left-eye image and the right-eye image remain same to enable normal stereoscopic observation.

If the eyes 12 of the observer moves in the vertical direction V to a position d4, the lines passing through the eyes 12 and the principal points of the cylindrical lenses 7a lie on the black matrix 10 of the pixel display unit 3, but the lights from the pixel apertures 11 are focused on the polarizing plates 4L, 4R and are spread after passing the polarizing plates, whereby the eyes 12 of the observer can receive the lights from the adjacent pixel apertures. Thus the normal stereoscopic observation is made possible though image becomes somewhat darker.

A graph at the left-hand side of FIG. 12 shows the change in the polarized component, wherein abscissa indicates the proportion of the polarized component of light entering either eye or the amount of crosstalk. It is indicated that the proportion of the polarized components always remains as 1 regardless of the position of the eyes of the observer, whereby the left and right images are always completely separated to enable the normal stereoscopic observation.

FIG. 13 shows the actual stereoscopic observation areas of the present embodiment, indicating the stereoscopic observation area in the stereoscopic display 501 of the present embodiment, at the optimum observation distance. 502 indicate normal stereoscopic observation areas, and there is no inverse stereoscopic observation area. The normal stereoscopic observation area is represented by a rectangle for the purpose of simplicity, but in fact it is spread over the plane of the rectangle.

Thus the stereoscopic observation area enabling stereoscopic observation without crosstalk in the vertical direction is further expanded, whereby the observer is assured of satisfactory stereoscopic observation without paying attention to the vertical position and is therefore relieved from fatigue.

In the present embodiment, the lenticular lens may be replaced by biconvex or plano-convex cylindrical microlenses.

In the present embodiment, as explained in the foregoing, a polarization control plate composed of an array of polarizing plates of different polarizing states is provided in front of the display, and, for the observation with the polarization spectacles, there is employed a microlens array composed of cylindrical lenses between the polarization control plate and the image display area of the display.

This configuration is further featured by facts that the polarization control plate is composed of an alternate array of the polarizing plates of mutually orthogonal polarizing directions in horizontal stripes, and that the microlens array is composed of lenticular lenses in horizontal stripe shapes corresponding to the pitch of the horizontal stripes of the polarization control plate.

The foregoing embodiments 1, 2 and 3 have employed the liquid crystal display as the image display means, but similar effects can also be obtained with other displays such as a plasma display, a fluorescent display tube, an EL display, a CRT or a rear projection display, by a configuration including a polarization control plate and a barrier or a microlens array in front of the display.

As explained in the foregoing, a three-dimensional image is displayed utilizing a polarization control plate, and, at the observation of the image, a barrier with apertures extended in a suitably predetermined direction or a lenticular lens is employed to expand the stereoscopic observation area with limited crosstalk in the vertical direction. In this manner there is provided a stereoscopic image display apparatus which reduces the fatigue of the observer and is particularly suitable for observation by plural observers.

What is claimed is:

1. A stereoscopic image display apparatus comprising:
   a display unit for combining and displaying, in an alternate array in a predetermined direction, plural stripe images, said stripe images being alternating parallax images arranged in a vertical direction for viewing by an observer with left and right eyes arranged in a horizontal direction;
   a polarizing member in which stripe-shaped polarizing parts with mutually different polarizing axes are alternately arranged respectively corresponding to said divided stripe images, wherein said divided stripe images are emitted by said polarizing member with different polarization characteristics for the left and right eyes, and the left and right eyes of the observer observing said display unit are respectively given the corresponding parts of said divided plural stripe images by the difference of the polarization characteristics whereby the observer can recognize a stereoscopic image; and
   an optical member provided with stripe-shaped apertures arranged in a vertical direction, respectively corresponding to said stripe images.

2. An apparatus according to claim 1, wherein said optical member is a barrier provided with slit-shaped apertures as said apertures.

3. An apparatus according to claim 2, wherein the width of said slit-shaped apertures is smaller than the width of each of the polarizing parts of said polarizing member.

4. An apparatus according to claim 3, wherein said barrier is provided at the light outgoing side of said polarizing member.

5. An apparatus according to claim 3, wherein said barrier is provided between said display unit and said polarizing member.

6. An apparatus according to claim 1, wherein said optical member is a lenticular lens including, as said apertures, cylindrical lenses having a refractive power in the direction of said arrangement.

7. An apparatus according to claim 1, wherein said display unit includes a liquid crystal display.

8. An apparatus according to claim 1, wherein said stripe images, said stripe-shaped polarizing parts and said stripe-shaped apertures have pitches smaller as they are positioned farther from illuminating means for illuminating said display unit.

9. A stereoscopic image display system comprising:

- a display unit for combining and displaying, in an alternate array in a predetermined direction, plural stripe images, said stripe images being alternating parallax images arranged in a vertical direction for viewing by an observer with left and right eyes arranged in a horizontal direction;
- a polarizing member in which stripe-shaped polarizing parts with mutually different polarizing axes are alternately arranged respectively corresponding to said stripe images, wherein said stripe images are emitted by said polarizing member with different polarization characteristics for the left and right eyes;
- an optical member provided with stripe-shaped apertures arranged in a vertical direction, respectively corresponding to said stripe images; and
- two polarizing plates provided respectively for the left and right eyes of the observer observing said display unit, wherein said two polarizing plates have mutually perpendicular polarizing states to provide the left and right eyes of the observer observing said display unit respectively with the corresponding parts of said stripe images by the difference of the polarization characteristics.

10. A system according to claim 9, wherein said optical member is a barrier provided with slit-shaped apertures as said apertures.

11. A system according to claim 10, wherein the width of said slit-shaped apertures is smaller than the width of each of the polarizing parts of said polarizing member.

12. A system according to claim 11, wherein said barrier is provided at the light outgoing side of said polarizing member.

13. A system according to claim 11, wherein said barrier is provided between said display unit and said polarizing member.

14. A system according to claim 9, wherein said optical member is a lenticular lens including, as said apertures, cylindrical lenses having a refractive power in the direction of said arrangement.

15. A system according to claim 9, wherein said display unit includes a liquid crystal display.

16. A system according to claim 9, wherein said stripe images, said stripe-shaped polarizing parts and said stripe-shaped apertures have pitches smaller as they are positioned farther from illuminating means for illuminating said display unit.

* * * * *

UNITED STATES PATENT AND TRADEMARK OFFICE
CERTIFICATE OF CORRECTION

PATENT NO. : 5,991,074
DATED : November 23, 1999
INVENTOR(S) : HIROYASU NOSE ET AL.

Page 1 of 3

It is certified that error appears in the above-identified patent and that said Letters Patent is hereby corrected as shown below:

ON THE TITLE PAGE

[57] ABSTRACT:

Line 2, "comprises" should read --having:--.

COLUMN 4:

Line 63, "cross-sectional" should read --cross-sectional view--.

COLUMN 5:

Line 3, "cross-sectional" should read --cross-sectional view--;
Line 9, "cross-sectional" should read --cross-sectional view--;
Line 28, "respective" should read --respectively--; and
Line 58, "wit" should --with--.

COLUMN 6:

Line 32, "moves" should read --move--;
Line 39, "wherein" should read --wherein the--; and
Line 42, "is" should read --are--.

COLUMN 7:

Line 18, "apertures" should read --apertures, which--.

UNITED STATES PATENT AND TRADEMARK OFFICE
CERTIFICATE OF CORRECTION

PATENT NO. : 5,991,074
DATED : November 23, 1999
INVENTOR(S) : HIROYASU NOSE ET AL.

It is certified that error appears in the above-identified patent and that said Letters Patent is hereby corrected as shown below:

COLUMN 8:

Line 15, "remains" should read --remains the--;
    Line 17, "wherein" should read --wherein the--;
    Line 20, "is" should read --are--;
    Line 28, "remains" should read --remains the--; and
    Line 29, "obtained" should read --attained--.

COLUMN 9:

Line 29, "lies" should read --lie--;
    Line 35, "remain" should read --remain the--;
    Line 37, "moves" should read --move--;
    Line 48, "wherein" should read --wherein the--; and
    Line 59, "indicate" should read --indicates--.

COLUMN 11:

Line 13, "from" should read --from the--.

UNITED STATES PATENT AND TRADEMARK OFFICE
CERTIFICATE OF CORRECTION

PATENT NO. : 5,991,074
DATED : November 23, 1999
INVENTOR(S) : HIROYASU NOSE ET AL.

It is certified that error appears in the above-identified patent and that said Letters Patent is hereby corrected as shown below:

<u>COLUMN 12</u>

Line 29, "from" should read --from the--.

Signed and Sealed this

Twenty-seventh Day of March, 2001

*Attest:*

NICHOLAS P. GODICI

*Attesting Officer*  Acting Director of the United States Patent and Trademark Office